United States Patent [19]
Watkins et al.

[11] Patent Number: 4,742,618
[45] Date of Patent: May 10, 1988

[54] BISECTOR SIGHTING DEVICE

[76] Inventors: Dennis L. Watkins, Rte. 1, Box 14-E, Fairmont, Okla. 73736; Steven C. Weast, 1418 N. Central, Enid, Okla. 73701

[21] Appl. No.: 10,796

[22] Filed: Feb. 4, 1987

[51] Int. Cl.$^4$ ............................................. G01B 11/20
[52] U.S. Cl. ......................................... 33/299; 33/286
[58] Field of Search ................ 33/1 H, 286, 263, 292, 33/299, 455, 412

[56] References Cited

U.S. PATENT DOCUMENTS

| | | | |
|---|---|---|---|
| 600,049 | 3/1898 | Thompson | 33/412 |
| 1,278,251 | 9/1918 | Syjud . | |
| 1,339,919 | 5/1920 | Cobb . | |
| 1,791,221 | 3/1931 | Murray . | |
| 2,431,101 | 11/1947 | Woods . | |
| 3,087,249 | 4/1963 | Grunning . | |
| 3,149,422 | 9/1964 | McBroome . | |
| 3,599,336 | 8/1971 | Walsh | 33/1 H X |
| 3,762,068 | 10/1973 | Clay . | |
| 3,807,050 | 4/1974 | Showalter . | |
| 3,828,443 | 8/1974 | James | 33/299 X |
| 4,480,390 | 11/1984 | Anthony | 33/286 |
| 4,580,345 | 4/1986 | Andrew . | |

FOREIGN PATENT DOCUMENTS

| | | |
|---|---|---|
| 360469 | 10/1922 | Fed. Rep. of Germany ........ 33/455 |
| 458924 | 4/1928 | Fed. Rep. of Germany ........ 33/455 |

*Primary Examiner*—Harry N. Haroian
*Attorney, Agent, or Firm*—Head & Johnson

[57] ABSTRACT

A device for visually identifying the bisector of an angle, curve, line or space between two points and for visually identifying any point or points along the bisector. The device includes a base, a first arm, a second arm, an indexing assembly, at least two connection assemblies, and a sight. The first and second arms each have a proximal end pivotally connected to the base. The longitudinal axes of the arms are generally coplanar and pivot coplanarly. The indexing assembly is connected between the first arm and the second arm and indexes the relative pivotal motion of the arms. The indexing assembly communicates the pivotal motion of either of the first or second arm into a pivotal motion of the other of the first or second arm and pivots both arms equidistantly and equiangularly relative to a median line between and generally coplanar with the arms in such a manner that the same median line always bisects the angle defined by the longitudinal axes of the two arms. At least one connection assembly is located on each arm. The connection assemblies connect the arms to the points to be bisected in such a manner that the distance from the connection assembly on each arm to the apex of the angle created by the longitudinal axes of the arms is equal. The sight is connected to the base and superposes the common plane of the first and second arms. The sight is aligned to precisely view and sight along the median bisector line.

6 Claims, 3 Drawing Sheets

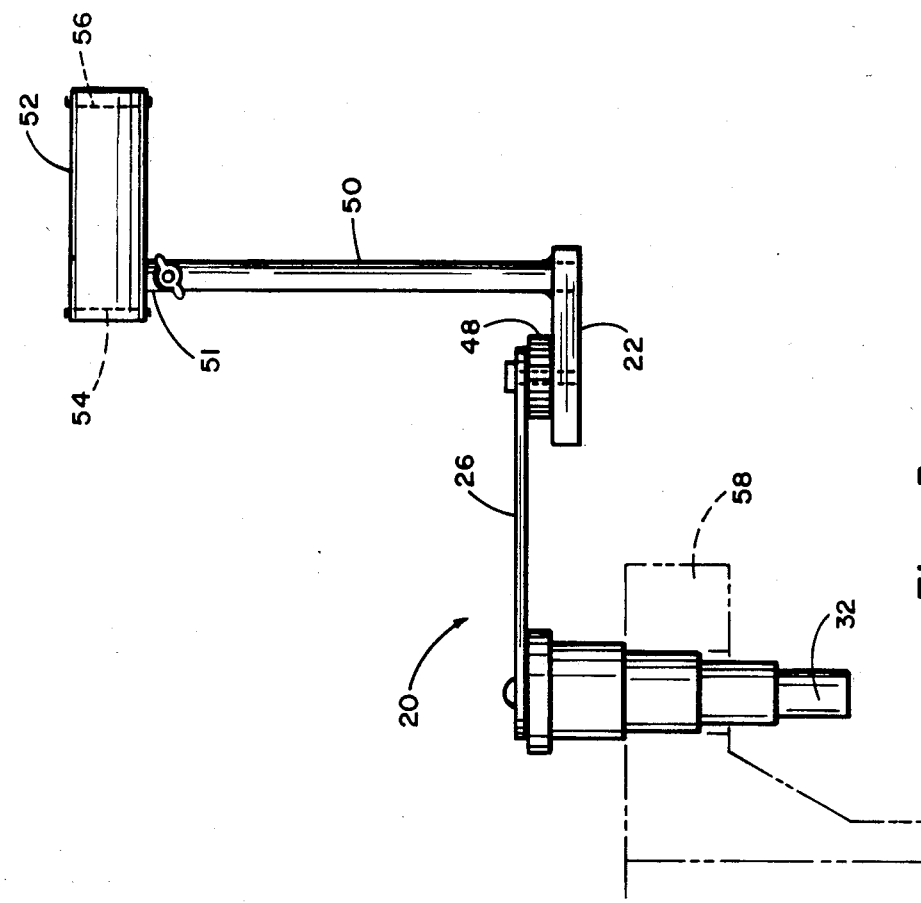
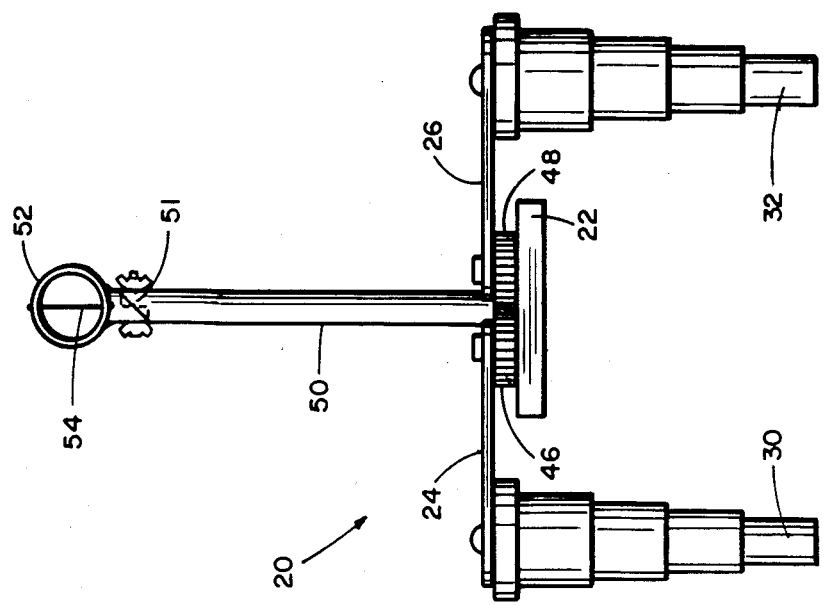
Fig. 3
Fig. 2

BISECTOR SIGHTING DEVICE

BACKGROUND OF THE INVENTION

The present invention generally relates to devices for identifying the bisector of an angle and more particularly is concerned with a device which may be used to visually identify the bisector of an angle, curve, line, or space between two points; to visually identify any point or points along the bisector; and which may also be used to align the bolt-holes of pipe flanges with the bolt-holes of mating flanges and to level the flanges.

SUMMARY OF THE INVENTION

It is an object of the present invention to provide a bisector sighting device which may be used to quickly and easily visually identify the bisector of an angle, curve, line, or space between two points and to identify any point or points along the bisector.

It is another object and advantage of the present invention to provide a bisector sighting device which may be used to orient and align the bolt-holes of a pipe flange with the bolt-holes of a mating flange regardless of whether the axis of the flange is co-axial or perpendicular with the axis of the piping with respect to which the flange bolt-holes are oriented.

It is another object and advantage of the present invention to provide a sighting device which may be quickly and easily used to identify the center of a circular object, such as a tank.

Accordingly, the present invention provides a bisector sighting device which includes a base, a first arm, and second arm. The first and second arms each have a proximal end pivotally connected to the base. The longitudinal axes of the arms are generally coplanar and pivot coplanarly. An indexing means is connected between the first arm and the second arm for indexing the relative pivotal motion of the first and second arms. The indexing means translates the pivotal motion of either of the first or second arm into a pivotal motion of the other of the first or second arm. The indexing means pivots both arms equidistantly and equiangularly relative to a median line between and generally coplanar with the first and second arms. The indexing means pivots the arms in such a manner that the same median line always bisects the angle defined by the longitudinal axes of the two arms. At least one connection means is located on each arm. The connection means are used to connect the arms to the points to be bisected in such a manner that the distance from the connection means on each arm to the apex of the angle created by the longitudinal axes of the arms is equal. A sight is also connected to the base. The sight superposes the common plane of the first and second arms and is aligned to precisely view and sight along the median bisector line.

In the preferred embodiment the indexing means is comprised of a first gear located near the proximal end of the first arm and a second gear located near the proximal end of the second arm. The gears are nonrotatably, fixedly connected to their respective arms and the cogs of the gears are intermeshed.

BRIEF DESCRIPTION OF THE DRAWINGS

The present invention will be better understood by reference to the examples of the following drawings:

FIG. 2 is a front view of the embodiment of FIG. 1 as viewed along line 2—2 of FIG. 1;

FIG. 3 is a side view of the embodiment of FIG. 1 which also illustrates the bisector sighting device mounted in a pipe flange;

DETAILED DESCRIPTION OF THE PREFERRED EMBODIMENTS

Figure 1:
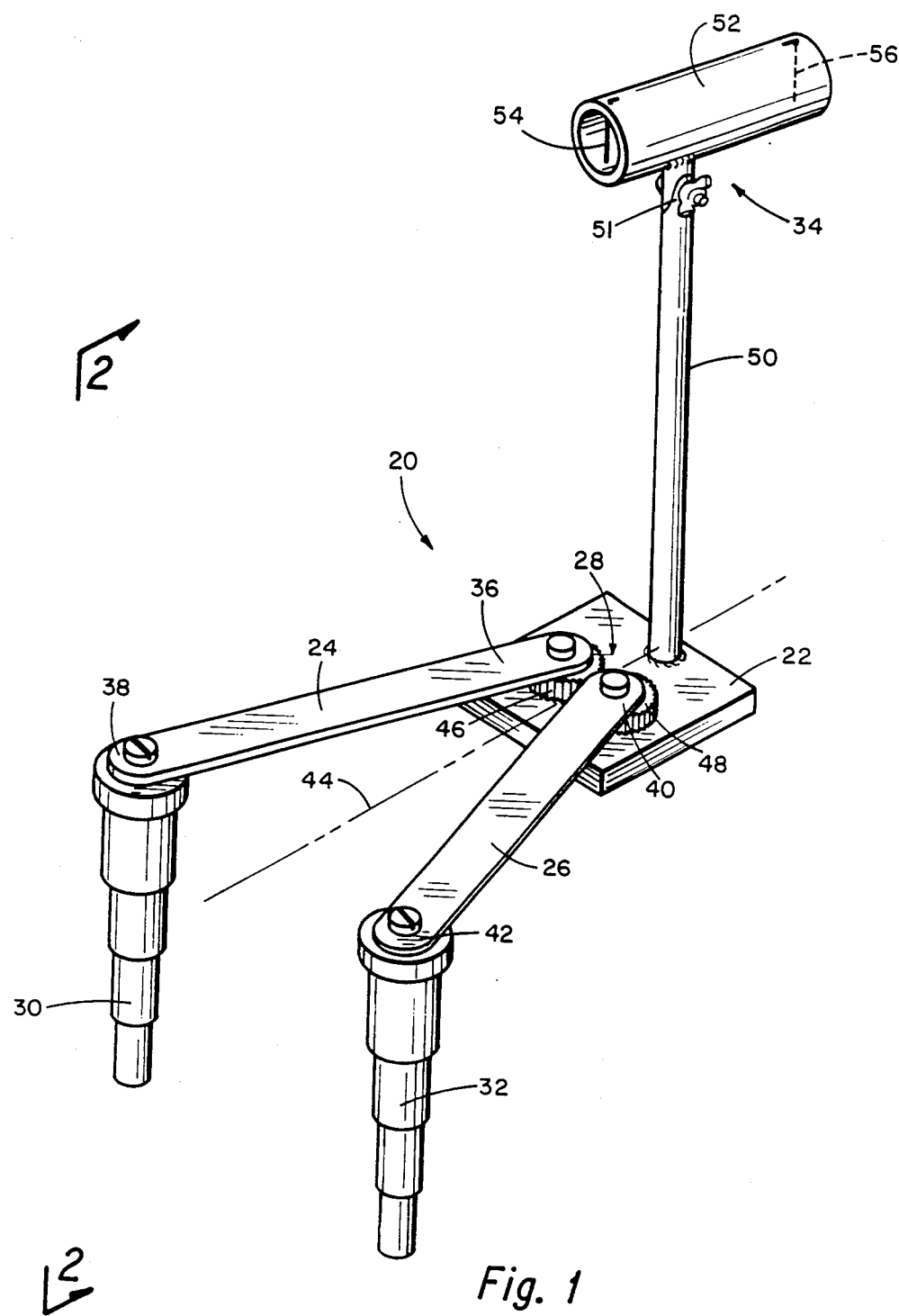
FIG. 1 is a perspective view of one embodiment of the bisector sighting device of the present invention.

Before explaining the present invention in detail, it is to be understood that the invention is not limited to the details of construction and arrangement of parts illustrated in the accompanying drawings, since the invention is capable of other embodiments and of being practiced or carried out in various ways commensurate with the claims herein. Also, it is to be understood that the phraseology or terminology employed herein is for the purpose of description and not of limitation.

FIGS. 1 through 4 present one preferred embodiment of the bisector sighting device, generally designated 20, of the present invention. Referring to the example of FIG. 1, the invention may be described as being generally comprised of a base 22, a first arm 24, a second arm 26, indexing means 28, at least two connection means 30, 32, and a sight 34. The first arm 24 has a proximal end 36 which is pivotally connected to the base 22 and has a distal end 38. The second arm 26 has a proximal end 40 which is pivotally connected to the base 22 and has a distal end 42. The longitudinal axis of the second arm 26 should be generally coplanar with the longitudinal axis of the first arm 24 and the longitudinal axis of the second arm 26 should pivot coplanarly with the longitudinal axis of the first arm 24 in order to maintain proper alignment and orientation of the sighting device 20, as further discussed below.

The indexing means 28 is connected between the first arm 24 and the second arm 26 and functions to index the relative pivotal motion of the first and second arms 24, 26. The indexing means 28 communicates the pivotal motion of either of the first arm 24 or the second arm 26 into a pivotal motion of the other of the first arm 24 or the second arm 26 and pivots both arms 24, 26 equidistantly and equiangularly relative to a median line 44 between and generally coplanar with the first and second arms 24, 26 in such a manner that the same median line 44 always bisects the angle defined by the longitudinal axes of the two arms 24, 26.

In the preferred embodiment of the sighting device, the indexing means 28 comprises a first gear 46 and a second gear 48, best seen in FIG. 1. The first gear 46 is located near the proximal end 36 of the first arm 24. The first gear 46 is nonrotatably and fixedly connected to the first arm 24. The second gear 48 is located near the proximal end 40 of the second arm 26. The second gear 48 is nonrotatably and fixedly connected to the second arm 26. The cogs of the second gear 48 intermesh with the cogs of the first gear 46 in order to produce the indexed relative motion of the first arm 24 and the second arm 26. In the preferred embodiment the first and second gear are of equal diameter and equal cog count in order to produce the equidistant and equiangular pivotal motion of the first and second arms 24, 26, although this same result may be reached by equivalent indexing means such as frictional engagement, the use of multiple gears, the use of gears interconnected with chains, the use of any gearing having an effective 1:1 gearing ratio, etc..

The connection means 30, 32 include at least one connection means 30 or 32 located on each arm 24, 26. The connection means 30, 32 function to connect the arms 24, 26 to the points on the angle, curve, line, or space to be bisected in such a manner that the distance from the connection means 30 or 32 on each arm 24, 26 to the apex of the angle created by the longitudinal axes of the arms 24, 26 is equal. The connection of the connection means 30, 32 to the points to be bisected creates an isosceles triangle with the base of the triangle being the distance between the points to be bisected or between the connection means 30, 32 and with the arms 24, 26 being the equal lengthed sides of the triangle, since the distance from the connection means to the apex of the angle created by the longitudinal axes of the arms 24, 26 is equal. Since a perpendicular bisector of the angle created by the equal lengthed sides of an isosceles triangle bisects the base of a triangle it is also the median line between the equal lengthed sides of the isosceles triangle and it also bisects any angle, curve, line, or space defined by the outer, more distantly spaced ends of the equal lengthed sides of the isosceles triangle. Therefore, the median bisector line 44 bisects the angle, curve, line, or space defined by the distance or space between connection means 30, 32.

In the preferred embodiment exemplified in FIGS. 1 through 4, the connection means 30, 32 comprise aperture engaging means (also designated 30, 32) for engaging bolt, screw, rivet receiving, and similar apertures. In the illustrated embodiment the aperture engaging means 30, 32 are stepped cylinders in which each of the steps are sized to precisely fit the various sizes of bolt-holes used in pipe flanges. The stepped cylinders may be replaced with cones, with interchangeable cylinders of various sizes, with latch type fasteners, with pin type fasteners, or with any equivalent fastening means. It should be noted that it is important that the connection means 30, 32, whatever form they take, equivalently orient the longitudinal axes of the first and second arms 24, 26 with respect to the points to be bisected as it is the longitudinal axes of the arms 24, 26 which define the median bisector line 44 sighted with the sighting device 20.

The arms 24, 26 may be made virtually any length, as necessary to reach the points to be bisected of a given situation. The connection means 30, 32 may be adjustable along the length of the arms in order to accommodate variations in distances between the points to be bisected. The only caveat is that the distance from the connection means 30, 32 on each arm 24, 26 to the apex of the angle defined by the longitudinal axes of the arms 24, 26 must be equal.

The sight 34 is connected to the base 22 and superposes the common plane of the longitudinal axes of the first and second arms 24, 26. The sight 34 should be aligned to precisely view and sight along the median bisector line 44. In the preferred embodiment exemplified in FIGS. 1 through 4, the sight includes a post 50. One end of the post 50 is connected to the base 22. In the illustrated preferred embodiment the longitudinal axis of the post 50 passes through the median bisector line 44. The sight 34 also includes a sight tube 52. The sight tube is pivotally mounted near the opposite end of the post 50 from the base 22. The pivotal mounting 51 of the sight tube 52 is oriented to restrict the pivoting sight tube 52 to sighting along the median bisector line 44.

The sight tube 52 of the preferred embodiment, best seen in FIG. 1, includes at least two sighting wires 54, 56 which are located in the field of view provided through the sight tube 52. The sighting wires 54, 56 are spaced apart with the longitudinal axes of the sighting wires being parallel. The plane defined by the longitudinal axes of the sighting wires passes through the longitudinal axis of the median bisector line which allows the sighting wires to visually identify the median bisector line 44 when the sighting wires 54, 56 are visually aligned to identify a single line. Proper alignment of the two sighting wires 54, 56 eliminates the potential for inaccurate sighting due to the parallax inherent in the use of only one wire.

The sighting device 20 should be made of a material which has sufficient rigidity and strength to retain and hold its shape during use, such as polymer, aluminum, metal, or alloys. It is of utmost importance to the accuracy of the sighting device that the longitudinal axes of the first arm 24 and second arm 26 remain coplanar during use and that the longitudinal axes of the sighting wires 54, 56 pass through the longitudinal axis of the median bisector line 44 in all positions and orientations of the sighting device 20.

Figure 4:
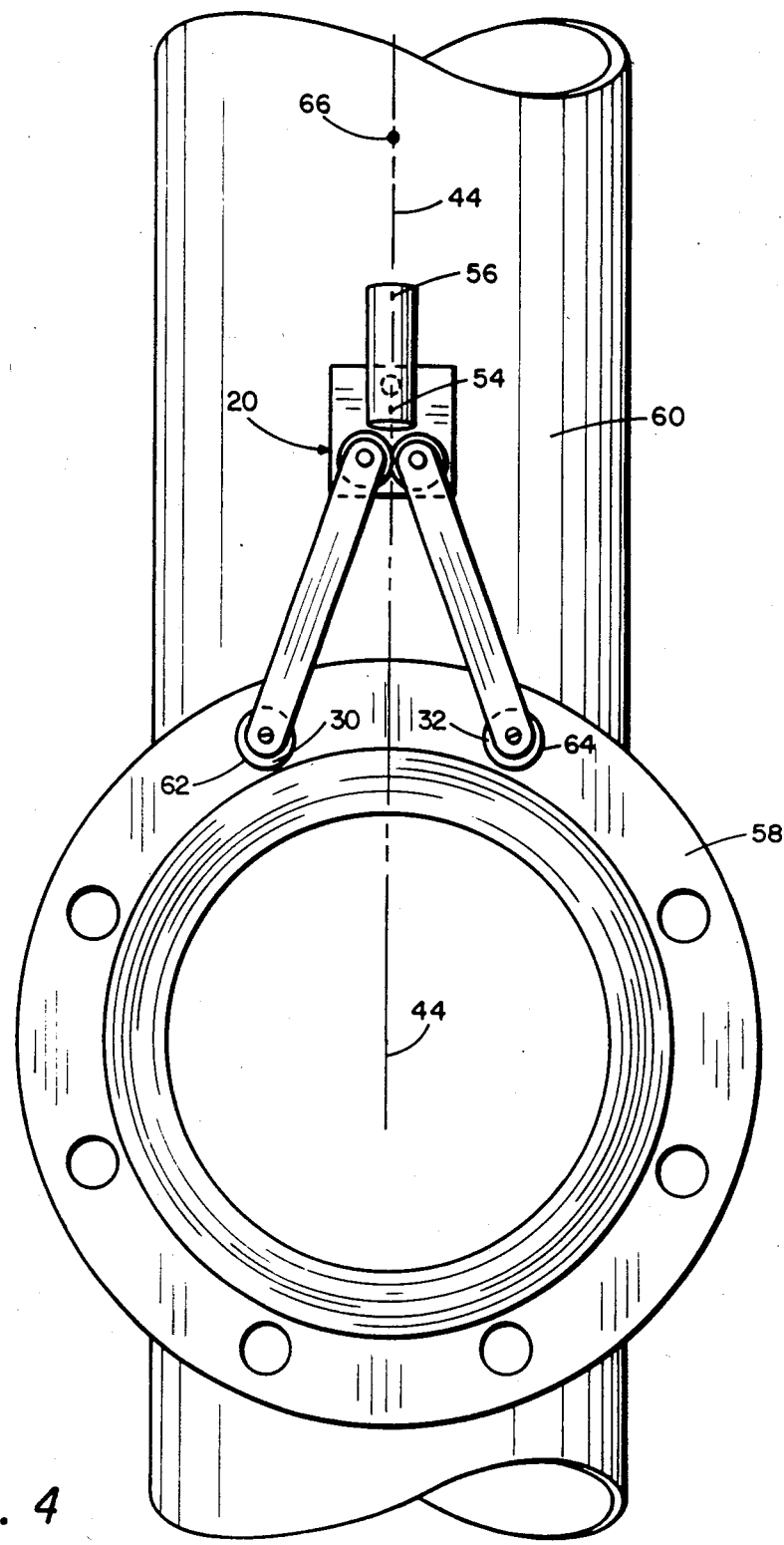
FIG. 4 is a plan view of the embodiment of FIG. 1 illustrating the invention as used to orient and align the bolt-holes of a flange.

The sighting device 20 may be used to properly position the bolt-holes in a pipe flange, as illustrated in FIG. 4. In this particular use the axis of the flange 58 to be aligned is perpendicular to the longitudinal axis of the pipeline 60 with respect to which the bolt-holes are to be oriented and the axis of flange 58 passes through the longitudinal axis of the pipeline 60. The connection means 30, 32 are placed in adjacent bolt-holes 62, 64 of flange 58 and the flange is rotated to the point that the sighting wires 54, 56 align with the longitudinal axis of the pipeline 60. The longitudinal axis of the pipeline 60 is identified by placing a punch mark 66 with a V-block, level, and punch at the top center of the outside surface of the pipeline 60. V-blocks to accomplish this purpose are commercially available and well known in the art. This procedure identifies the location of the flange bolt-holes and assures that they will align with the bolt-holes of the mating flange on the adjacent pipe section.

The sighting device 20 may be similarly used to align the bolt-holes of in-line flanges (not illustrated) which are coaxial with the piping sections with which the flanges are to be aligned, that is flanges which are used to bolt a continuing length of coaxial piping together. This is accomplished by inserting the connection means 30, 32 into adjacent flange bolt-holes (not illustrated), pivoting the sight tube 52 to sight along the length of pipe to which the flange is to be connected, aligning the sighting wires 54, 56 on a punch mark located on the top center of the coaxial piping, and welding the flange in position.

Another use of the sighting device, which is not illustrated, is in finding the center of a circular object, such as a tank. The connection means 30, 32 or the distal ends 38, 42 of arms 24, 26 are held in contact with the outside circular surface or the outside circumference of the tank or circular object, and the sighting wires 52, 54 are aligned to define and mark a point on each side of the tank and a first diametrical line is drawn across the tank between the two points. The sighting device 20 is then moved around the tank to a different position, preferably 90° to 180° around the tank from the initial position and the procedure is repeated, i.e., the sighting device is used to mark a point on each side of the tank which lies on the median bisector line defined by aligning the sighting wires 54, 56 and a second diametrical line is drawn between the two points. The intersection of the lines drawn from the first position and the second position of the sighting device 20 defines the center of the tank or circular object. It should be noted that for this measurement to be accurate the first and second arms 24, 26 should be positioned coplanarly with a radial cross-section of the tank or circular object and the plane defined by the longitudinal axes of the sighting wires 54, 56 should be coplanar with the axis of the tank or circular object.

Level indicators, such as bubble-type levels (not illustrated) may be provided on the sighting device 20 to enhance the precision, accuracy, and usefulness of the device 20. For example, a level indicator may be provided on the base 22 to indicate when the plane defined by the longitudinal axes of the first and second arms 24, 26 is horizontal. As another example, a level indicator may be provided on the base 22 to indicate when the plane defined by the axes of the aperture engaging means 30, 32 is horizontal. Use of these level indicators would not only enhance the use of the sighting device in defining the bisector of a space or angle and in aligning the bolt-holes of a series of flanges, but would also allow the sighting device to be used to level the flanges, if so desired.

An angular indicating scale (not illustrated) may be included with the pivotal mounting 51 of the sight tube 51 to indicate the angular orientation of the sight tube. The addition of the angular indicating scale with the level indicators discussed above would allow the sighting device 20 to be used similarly to a transit in determining the spatial relationships of one object to another. For example, the sighting device 20 could be used to determine the elevational relationships of the pipe flanges discussed above.

While the invention has been described with a certain degree of particularly it is manifest that many changes may be made in the details of construction and the arrangement of components without departing from the spirit and scope of this disclosure. It is to be understood the invention is not limited to the embodiment set forth herein for purposes of exemplification, but is to be limited only by the scope of the attached claim or claims including the full range of equivalency to which each element thereof is entitled.

What is claimed is:

1. A device for visually identifying the bisector of an angle, curve, line or space between two points and for visually identifying any point or points along the bisector, comprising:
    a base;
    a first arm having a proximal end pivotally connected to the base and a distal end;
    a second arm having a proximal end pivotally connected to the base and a distal end, the longitudinal axis of the second arm being generally coplanar with and pivoting coplanarly with the longitudinal axis of the first arm;
    indexing means, connected between the first arm and the second arm, for indexing the relative pivotal motion of the first and second arms, the indexing means communicating the pivotal motion of either of the first arm or the second arm into a pivotal motion of the other of the first arm or the second arm, the indexing means pivoting both arms equidistantly and equiangularly relative to a median line between and generally coplanar with the arms in such a manner that the same median line always bisects the angle defined by the longitudinal axes of the two arms, the indexing means including:
        a first gear, located near the proximal end of the first arm, the first gear being non-rotatably, fixedly connected to the first arm; and
        a second gear, located near the proximal end of the second arm, the second gear being non-rotatably, fixedly connected to the second arm, the cogs of the second gear intermeshing with the cogs of the first gear;
    at least two connection means, at least one connection means located on each arm, for connecting the arms to the points to be bisected in such a manner that the distance from the connection means on each arm to the apex of the angle created by the longitudinal axes of the arms is equal; and
    a sight, connected to the base, the sight superposing the common plane of the first and second arms, the sight being aligned to precisely view and sight along the median bisector line.

2. The device of claim 1 in which the connection means comprises:
    aperture engaging means for engaging bolt, screw, and rivet receiving apertures.

3. A device for visually identifying the bisector of an angle, curve, line or space between two points and for visually identifying any point or points along the bisector, comprising:
    a base;
    a first arm having a proximal end pivotally connected to the base and a distal end;
    a second arm having a proximal end pivotally connected to the base and a distal end, the longitudinal axis of the second arm being generally coplanar with and pivoting coplanarly with the longitudinal axis of the first arm;
    indexing means, connected between the first arm and the second arm, for indexing the relative pivotal motion of the first and second arms, the indexing means communicating the pivotal motion of either of the first arm or the second arm into a pivotal motion of the other of the first arm or the second arm, the indexing means pivoting both arms equidistantly and equiangularly relative to a median line between and generally coplanar with the arms in such a manner that the same median line always bisects the angle defined by the longitudinal axes of the two arms;
    at least two connection means, at least one connection means located on each arm, for connecting the arms to the points to be bisected in such a manner that the distance from the connection means on each arm to the apex of the angle created by the longitudinal axes of the arms is equal; and
    a sight, connected to the base, the sight superposing the common plane of the first and second arms, the sight being aligned to precisely view and sight along the median bisector line; the sight including:
        a post, one end of the post connected to the base; and
        a sight tube, the sight tube being pivotally mounted near the other end of the post, the pivotal mounting being oriented to restrict the pivoting sight tube to sighting along the median bisector line.

4. The device of claim 4 in which the sight tube comprises:

at least two sighting wires located in the field of view provided through the sight tube, the sighting wires being spaced apart, the longitudinal axes of the sighting wires being parallel, the plane defined by the longitudinal axes of the sighting wires passing through the longitudinal axis of the median bisector line, and the sighting wires visually identifying the median bisector line when the sighting wires are visually aligned to identify a single line.

5. A device for visually identifying the bisector of an angle, curve, line, or space between two points and for visually indentifying any point or points along the bisector, comprising:

a base;

a first arm having a proximal end pivotally connected to the base and a distal end;

a second arm having a proximal end pivotally connected to the base and a distal end, the longitudinal axis of the second arm being generally coplanar with and pivoting coplanarly with the longitudinal axis of the first arm;

a first gear, located near the proximal end of the first arm, the first gear being nonrotatably, fixedly connected to the first arm;

a second gear, located near the proximal end of the second arm, the second gear being nonrotatably, fixedly connected to the second arm, the cogs of the second gear intermeshing with the cogs of the first gear, the first and second gears communicating the pivotal motion of either of the first arm or the second arm into a pivotal motion of the other of the first arm or the second arm, the first and second gears pivoting both arms equidistantly and equiangularly relative to a median line between and generally coplanar with the arms in such a manner that the same median line always bisects the angle defined by the longitudinal axes of the two arms;

at least two connections means, at least one connection means located on each arm, for connecting the arms to the points to be bisected in such a manner that the distance from the connection means on each arm to the apex of the angle created by the longitudinal axes of the arms is equal;

a post, one end of the post connected to the base; and a sight tube, the sight tube being pivotally mounted near the other end of the post, the pivotal mounting being oriented to restrict the pivoting sight tube to sighting along the median bisector line.

6. A device for visually identifying the bisector of an angle, curve, line, or space between two points and for visually identifying any point or points along the bisector, comprising:

a base;

a first arm having a proximal end pivotally connected to the base and a distal end;

a second arm having a proximal end pivotally connected to the base and a distal end, the longitudinal axis of the second arm being generally coplanar with and pivoting coplanarly with the longitudinal axis of the first arm;

a first gear, located near the proximal end of the first arm, the first gear being nonrotatably, fixedly connected to the first arm;

a second gear, located near the proximal end of the second arm, the second gear being nonrotatably, fixedly connected to the second arm, the cogs of the second gear intermeshing with the cogs of the first gear, the first and second gears communicating the pivotal motion of either of the first arm or the second arm into a pivotal motion of the other of the first arm or the second arm, the first and second gears pivoting both arms equidistantly and equiangularly relative to a median line between and generally coplanar with the arms in such a manner that the same median line always bisects the angle defined by the longitudinal axes of the two arms;

at least two aperture engaging means, at least one aperture engaging means located on each arm, for engaging bolt, screw, and rivet receiving apertures and thereby connecting the arms to the points to be bisected in such a manner that the distance from the aperture engaging means on each arm to be apex of the angle created by the longitudinal axes of the arms is equal;

a post, one end of the post connected to the base;

a sight tube, the sight tube being pivotally mounted near the other end of the post, the pivotal mounting being oriented to restrict the pivoting sight tube to sighting along the median bisector line; and at least two sighting wires located in the field of view provided through the sight tube, the sighting wires being spaced apart, the longitudinal axes of the sighting wires being parallel, the plane defined by the longitudinal axes of the sighting wires passing through the longitudinal axis of the median bisector line, and the sighting wires visually identifying the median bisector line when the sighting wires are visually aligned to identify a single line.

* * * * *